L. P. MOOERS.

POWER TRANSMITTING MECHANISM FOR AUTOMOBILES.

APPLICATION FILED APR. 13, 1909.

Reissued June 1, 1909.

12,966.

2 SHEETS—SHEET 1.

Witnesses:

A. L. Lord

N. L. Freeman

Inventor.

Louis P. Mooers

By Thurston & Woodward

Attorneys.

L. P. MOOERS.

POWER TRANSMITTING MECHANISM FOR AUTOMOBILES.

APPLICATION FILED APR. 13, 1909.

Reissued June 1, 1909.

12,966.

2 SHEETS—SHEET 2.

Witnesses:
A. L. Lord.
N. L. Freeman

Inventor.
Louis P. Mooers
By Thurston & Woodward
Attorneys.

UNITED STATES PATENT OFFICE.

LOUIS P. MOOERS, OF GENEVA, OHIO, ASSIGNOR TO THE PEERLESS MOTOR CAR COMPANY, OF CLEVELAND, OHIO, A CORPORATION OF WEST VIRGINIA.

POWER-TRANSMITTING MECHANISM FOR AUTOMOBILES.

No. 12,966. Specification of Reissued Letters Patent. Reissued June 1, 1909.

Original No. 832,991, dated October 9, 1906, Serial No. 149,624. Application for reissue filed April 13, 1909. Serial No. 489,744.

*To all whom it may concern:*

Be it known that I, LOUIS P. MOOERS, a citizen of the United States, residing at Geneva, in the county of Ashtabula and State of Ohio, have invented a certain new and useful Improvement in Power-Transmitting Mechanism for Automobiles, of which the following is a full, clear, and exact description.

The invention relates to the mechanism which forms the operative connection between the driven wheels and the longitudinal driving shaft of an automobile or analogous machine.

The particular object of this invention is to provide a construction, including the differential gearing, whereof all the working parts will be incased and so connected as to permit the outward withdrawal of the live axle sections and the consequent disconnection of the driving wheels from the differential mechanism, whereby the latter may be handled as a unit and so removed from the casing, or restored to the casing after the parts thereof, including the supporting bearings, have been properly adjusted relative to each other.

The invention may be here summarized as consisting of the construction and combination of parts hereinafter described, and pointed out definitely in the claims.

Figure 1:
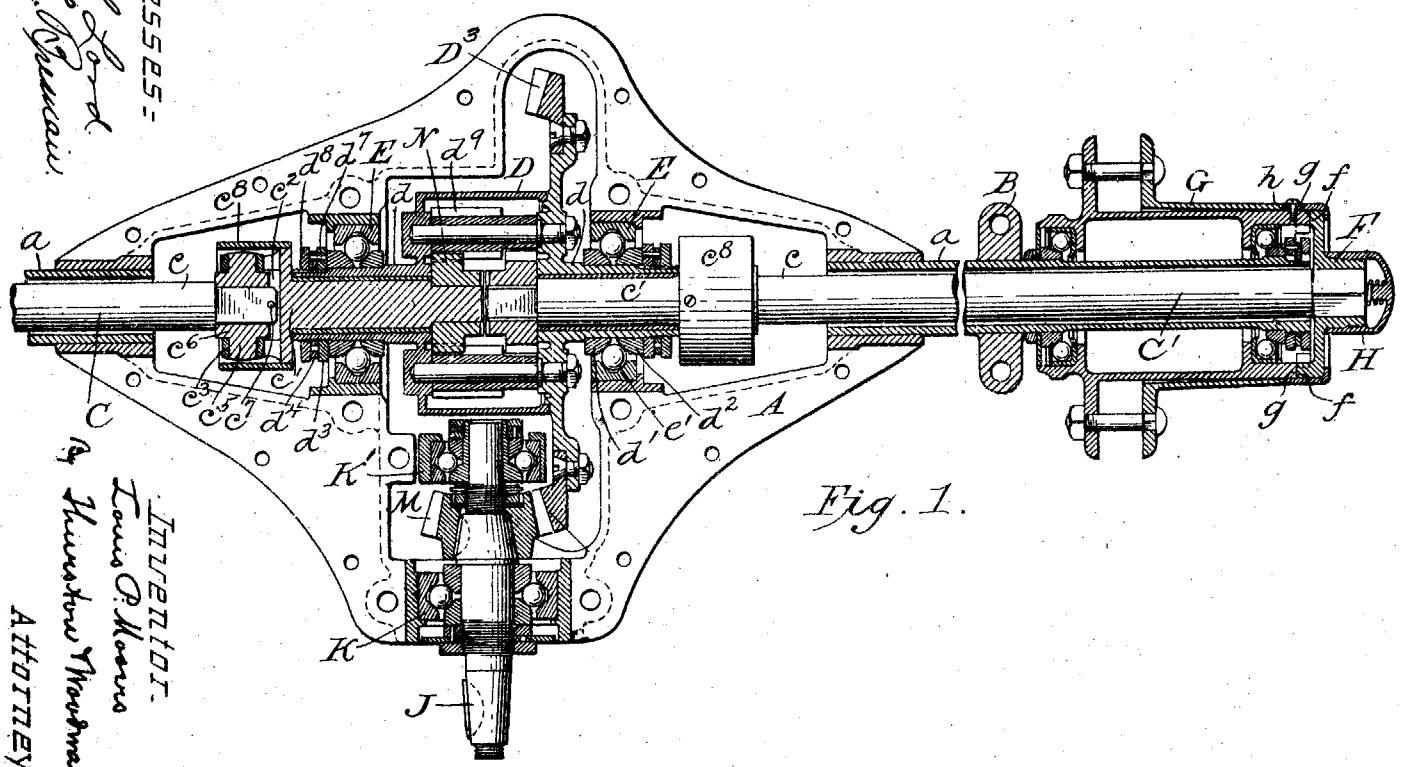
Figure 2:
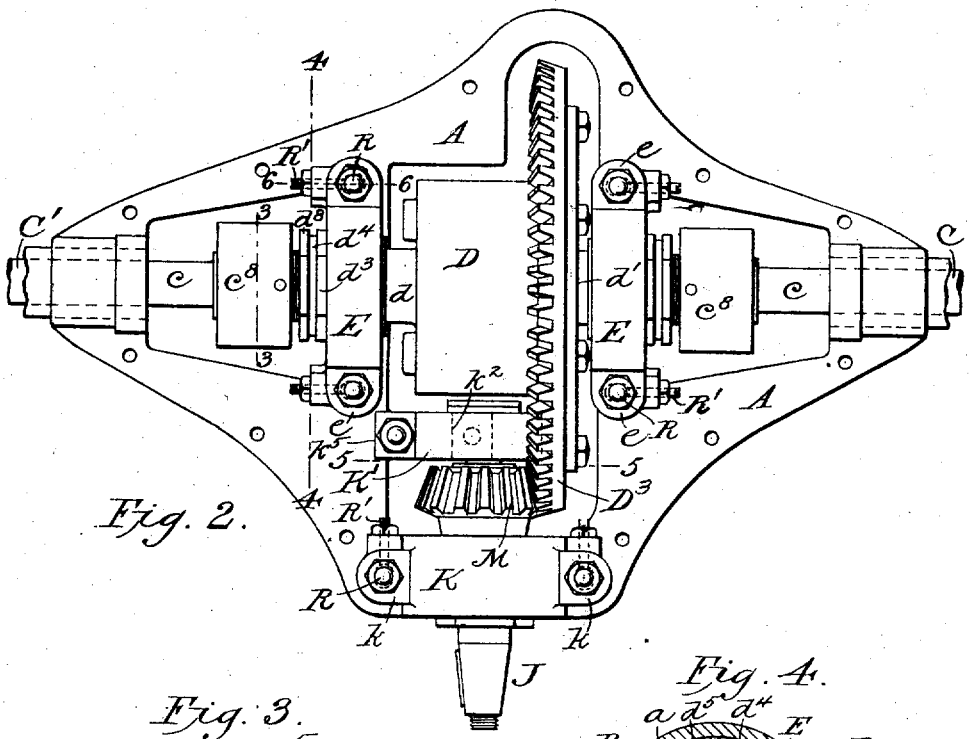
Figure 3:
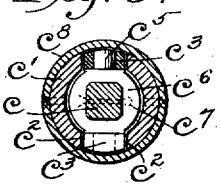
Figure 4:
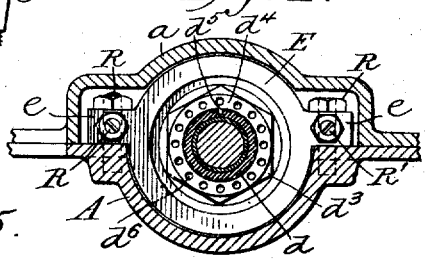
Figure 5:
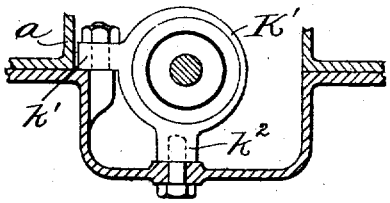
Figure 6:
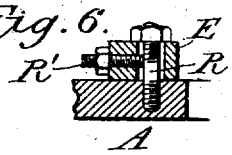

In the drawings, Figure 1 is a plan view of said driving mechanism when the upper cap of the casing is removed and most of the parts are in central horizontal section. Fig. 2 is a plan view of the mechanism as it appears when the casing cap only is removed. Fig. 3 is a transverse sectional view on line 3—3 of Fig. 2. Fig. 4 is a transverse sectional view on line 4—4 of Fig. 2. Fig. 5 is a sectional view on the line 5—5 of Fig. 2, and Fig. 6 is a detail in section on the line 6—6 of Fig. 2.

Referring to the parts by letters, A represents a centrally-disposed casing, from which two tubes *a*, *a*, which are rigidly fastened to the casing, extend laterally in opposite directions toward the side of the vehicle. The casing consists of a body portion, which is the lower half of it and the part to which the tubes *a* are rigidly connected, and a removable cap *a'*, a portion of which is shown in Figs. 4 and 5, the plane of separation between the body and cap being substantially diametrical. Spring seats B are secured to the tubes *a*, whereby said tubes may be connected with the springs which support the vehicle-body.

The differential mechanism unit includes a rotatable supporting member shown in the form of a drum D, having two oppositely extended tubular hubs *d*, which are rotatably mounted on ball bearings in rings E; a gear D fixed externally to said drum; a plurality of planetary or compensating gears $d^9$ which are located inside the drum and are independently supported thereby so that they are rotatable upon axes parallel with the axis of the drum; and two driven gears N which are located inside of the drum and are independently mounted thereon so as to be rotatable about an axis which is coincident with the axis of said drum. These driven gears N are so mounted by being attached to the inner ends of short shaft sections *c'*, which extend through the hubs *d* of the drum and are rotatably mounted therein. This differential gearing composed of the parts above specified may, obviously, be handled as a unit. The various parts thereof may be assembled and adjusted relative to each other [illegible] said differential mechanism is outside of the casing and entirely separated from the rest of the mechanism. The bearing rings E may be properly positioned lengthwise of the hubs *d* while the differential gearing is out of the casing so that when said gearing is put into the casing nothing remains to render it operative except to properly connect these rings with the casing. The opening in the top of the casing, which the cap covers, is, in the form shown, large enough for this differential gear unit to be passed in and out of the casing. Rotary motion is transmitted to this differential gearing unit from a driving shaft J by means of a beveled gear M secured to said shaft within the casing, and meshing with the beveled gear $D^8$ which is fast to the drum D.

Each of the two live axle sections C, C' extends entirely through the associated tube *a* into the casing at one end and beyond said tube at the outer end. The inner ends of said axle sections within the casing have an operative connection with the differential gearing, and particularly with the driven gears N, said connection being a telescoping connection which compels them to rotate in unison, but permits the axle sections to be drawn longitudinally upward so as to sever said operating connection.

The joint between each axle section and the adjacent short shaft $c'$ is alike on both sides of the differential mechanism, and, as shown, is of such character that rotary motion will be transmitted from the short shaft $c'$ to the associated axle section, even though said axle section may in service get out of alinement with the corresponding short shaft. The connection between each short shaft $c'$ and axle section, as shown, is specifically of the following construction, to wit: The outer end of each short shaft $c'$ is enlarged and made tubular, and in this enlarged end is formed a diametrical groove $c^2$, wide enough to receive the squared collars $c^3$. These collars are loosely fitted on studs $c^5$ which project radially from a collar $c^6$ which is non-rotatably secured to the inner end of the corresponding axle section. In the specific construction shown this collar $c^6$ is fitted onto the squared end of the axle section, and is held thereon by a cotter pin $c^7$. The operative connection between each axle section and the differential gearing is attained by the inward endwise movement of the axle section which causes the squared collar $c^3$ to engage, as stated, in the groove $c^2$. This joint connection may be concealed and in some measure protected and the connections certainly maintained by a sleeve $c^8$ secured over the outer tubular end of the short shaft $c'$.

The described engagement between each axle section and the differential gearing is maintained so long as the outward endwise movement of said axle section is prevented; and it is prevented in the construction shown because said axle section is connected with the hub G of a driving wheel which is rotatably mounted upon the tube A near the outer end thereof, the bearings for said hub being adjustable ball bearings of familiar form which prevent the endwise movement of said wheel hub relative to the supporting tube. The outer end of each axle section is square and projects out of the tube $a$. A flanged collar F is fitted to the squared outer end of said axle section, and it is provided with clutch jaws $f$ which engage with corresponding jaws $g$ on the outer end of the hub G. This engagement is maintained and relative movement of the axle section and hub is prevented by means of a cap H which is fastened to the hub and has a flange $h$ which overhangs and engages with the collar F. It is to be noted that the axle sections C, C', although they extend through the tube $a$, do not touch the same, and are supported only at their ends, the inner ends being supported by the telescoping connections, with the short shafts $c'$ and the outer ends by the means connecting them with the hubs G. The rear section J of the longitudinal driving shaft projects into the casing, as before stated, and is rotatably mounted upon ball bearings in two rings K, K', which are rigidly but removably adjustably secured to the casing.

The specific construction shown of the ball-bearings in which the hubs of the differential drum is rotated is as follows: A cone $d'$ is fitted upon the hub, abutting a shoulder thereof. The ring E has an internal groove $e'$. A second cone $d^2$ is slidably fitted upon said hub, and the balls occupy a raceway formed between said two cones and the groove in said ring. The cone $d^2$ may be adjusted toward the cone $d^1$ by means of an adjustment nut $d^3$, which screws onto the hub $d$. A washer $d$ fits upon this threaded part of the hub and has a tongue $d^5$, which enters a longitudinal groove in the hub $d'$, whereby the washer is prevented from rotating. The washer has a plurality of holes $d^6$, arranged concentrically, and a pin $d^7$ may be passed through any one of these holes into a corresponding hole in the adjustment nut $d^3$, whereby the rotation of said nut is prevented. The washer is maintained in a position against the adjustment nut by a lock nut $d^8$. The employment of the bearing rings E, E, K, K' are exceedingly good specific means for attaining very desirable results in mechanism of this sort. The differential drum is through the rings E E mounted directly upon the casing and is wholly supported thereby independently of the axle sections. The differential drum may be moved axially to take up slight wear in its ball bearings or to cause the gear $D^3$ to mesh more accurately with the gear M, and the driving shaft J may also be moved endwise to better insure the proper intermeshing of said beveled gears or for any other purpose. The construction which permits these last-named adjustments is shown clearly in Figs. 2 and 4. The rings E E and K K' are connected to the casing by screws R, which pass loosely through the holes in the ears and screw into the casing. The rings may then be adjusted nicely by means of set-screws R', which screw horizontally through said ears and into contact with the screws R. When said rings have been properly positioned, they will be fixed in said positions by tightening up the screws R. This adjustment of the differential drum has no effect upon the position of the axle-sections.

In order to sever the operative connection between the axle-sections and the differential mechanism, one has only to remove the collars H and draw the axle-sections longitudinally outward. The casing cap may be removed and, if desired, the rings E E and K K' may be disconnected, whereupon the entire differential gearing and the driving shafts will be removed for repair or adjustment, and the doing of these things does not involve the disconnection of the tubes *a* from the vehicle-body.

The members *c'* have been described as short shafts rigidly connected with the gears N; but they may with equal accuracy be regarded as inner sections of the axle. As a matter of fact, they are the means for mounting the gears N and serve to connect them with the outer axle-sections C C', and it does not seem to matter much in what language they are described or whether they are considered as parts of the axle or differential mechanism. The member D is also referred to herein as a "differential drum" because the expression seems more accurately descriptive of the precise form in which the element is shown, but it is not intended that the claims be limited to this particular "drum" form.

Having described my invention, I claim:

1. The combination of a casing having a removable cap, a driving shaft mounted in said casing, two axles each consisting of two sections which may be disconnected by the outward endwise movement of the outer section, and means transmitting automatically differentiated motion from said shaft to said axles, which differential means includes a supporting member having laterally extended tubular hubs which serve as bearings for the inner ends of said axles, rings by which said tubular hubs are supported and in which they are rotatably mounted, which rings are separably connected with the casing, whereby, when the casing cap is removed, and the outer axle sections are disconnected from the inner axle sections, said differential mechanism, bearing rings and inner axle sections may be removed as a unit from the casing without disturbing their relation to each other, substantially as described.

2. The combination of a casing having a removable cap, a driving shaft mounted in said casing, two axles,—each consisting of two sections which may be disconnected by the outward endwise movement of the outer section and mechanism transmitting automatically differentiated motion from said shaft to said axle, said mechanism including a supporting member having laterally extended hubs in which the inner axle sections are rotatably mounted, with bearing rings in which said hubs are rotatably mounted, said bearing rings having ears which are separably secured to said casing, substantially as described.

3. The combination of a casing having a removable cap, a driving shaft mounted in said casing, two axles,—each consisting of an inner section and an outer section which sections may be disconnected by the endwise outward movement of the outer section,—and mechanism transmitting automatically differentiated motion from said shaft to said axles, which mechanism includes a supporting member having laterally extended tubular hubs in which the inner ends of said axle sections are rotatably mounted, with bearing rings in which said hubs are rotatably mounted, said rings having perforated ears, bolts passing loosely through the holes in said ears, and screwing into said casing, and adjusting screws screwing through said ears into engagement with said bolts, substantially as described.

4. The combination of a casing having a removable cap, a driving shaft extending into the casing, two inner axle sections, differential power transmitting mechanism in said casing intermediate of said shaft and axle sections, which mechanism includes a supporting member having laterally extended tubular hubs in which said inner axle sections are rotatably mounted, with two outer axle sections extending into the casing and being separably connected with the inner axle sections, said outer sections being capable of endwise movement to break said separable connections, substantially as described.

5. The combination of a casing having a removable cap, a driving shaft extending into the casing and rotatably mounted therein, and a differential drum having laterally extended hubs, with bearing rings in which said hubs are rotatably mounted, which rings are removably connected with the casing, an operative connection between said driving shaft and drum, two alined axle sections independently mounted in the hubs of said differential drum, and differential mechanism mounted upon said drum transmitting power therefrom to said axle sections, substantially as described.

6. The combination of a casing having a removable cap, a differential drum having hubs which are mounted in said casing, compensating gears mounted upon said drum, two axles which extend into said casing and into said drum being rotatably mounted in the hubs of said drum, each axle being composed of two separable sections, and driven gears in said drum in mesh with said compensating gears and operatively secured to said axles respectively, the outer parts of said axles being capable of outward endwise movement to break the operative connection between themselves and said driven gears.

7. The combination of a casing having a removable cap, a driving shaft extending into said casing, a differential drum in said casing operatively connected with said driving shaft and having laterally projecting hubs, bearing rings in which said hubs are rotatably mounted, said rings being removably secured to the casing and adjustable thereon, axles which project into said casing and into said drum, being rotatably mounted in the hubs of said drum, driven gears in said drum secured to said axles, and compensating gears carried by the drum and engaging with said driven gears.

8. The combination of a casing having two laterally extended tubes, a driving shaft extending into said casing, two outer axle sections extending through said tubes into said casing, differential mechanism within said casing and rotatably supported thereby, two inner axle sections rotatably mounted in the supporting member of said differential mechanism and having separable but operative connections with said outer axle sections, with wheel hubs mounted upon said tubes, collars having a non-rotative connection with the projecting ends of said outer axle sections, interlocking jaws upon said wheel hubs and collars respectively, and means holding said jaws in operative engagement, substantially as described.

9. The combination of a casing having two laterally extended tubes, a driving shaft extending into said casing, two axles each consisting of two separably connected sections extending through said tubes into said casing, differential mechanism within the casing for transmitting motion from the driving wheel to the inner axle sections, said differential mechanism including a supporting member having laterally extended tubular hubs in which the inner ends of the axle sections are rotatably mounted, bearing rings separably connected with said casing in which said tubular hubs are rotatably mounted, with wheel hubs mounted upon said tubes, flanged collars having a non-rotative connection with the projecting ends of the outer axle sections, interlocking jaws upon said wheel hubs and collar flanges respectively, and caps secured to the wheel hubs and engaging with said collar whereby to hold said jaws in engagement, substantially as described.

10. The combination of a casing having two laterally extended tubes in axial alinement, differential mechanism within said casing having laterally extended tubular hubs, bearing rings which are removably fastened to the casing and in which said tubular hubs are rotatably mounted, two inner axle sections rotatably mounted in said tubular hubs, two outer axle sections extending through said tubes and separably connected at their inner ends with the inner axle sections, and wheels rotatably mounted upon said tubes and connected with the outer ends of said outer axle sections, substantially as described.

11. The combination of a casing having two laterally extended tubes in axial alinement, a differential drum having laterally extended tubular hubs, rings in which said hubs are rotatably mounted, which rings are removably fastened to said casing, two inner axle sections rotatably mounted in said hubs, two outer axle sections extending through said tubes and separably connected at their inner ends with the inner axle sections, wheels rotatably mounted upon said tubes and connected with the outer ends of said outer axle sections, a beveled gear secured to the differential drum, compensating gears mounted upon said drum, gears secured to the inner ends of the inner axle sections in mesh with said compensating gears, a driving shaft, two bearing rings in which it is rotatably mounted, which rings are removably secured to the casing, and a beveled gear secured to said driving shaft in mesh with the beveled gear on the differential drum, substantially as described.

12. The combination of a differential drum having laterally extended tubular hubs, bearing rings in which said hubs are rotatably mounted, said rings having outwardly extended ears, a suitable support to which said ears are separably connected, inner axle sections rotatably mounted in the hubs of said drum, differential mechanism carried by the drum and transmitting motion from it to said axle sections, a beveled gear secured externally to said differential drum, a driving shaft, two bearing rings in which said shaft is rotatably mounted, one having outwardly extended ears adapted for connection with said support and the other having one ear and having also a threaded boss on its lower side by which said ring may be secured to said support, a beveled gear secured to said shaft between said rings in mesh with the external beveled gear upon the differential drum.

13. The combination of a differential gear casing, with differential gearing within said casing comprising a supporting member having oppositely extended alined tubular hubs which are rotatably mounted in bearings fixed to said casing, compensating gears mounted upon said supporting member and driven gears meshing with said compensating gears and mounted on said supporting member with their axes coincident with the axis of rotation of said supporting member, axle sections which extend into said casing and have a telescoping driving connection with said driven gears respectively, whereby they are separable therefrom by endwise movement without displacing said differential mechanism.

14. The combination of a differential gear casing, with differential gearing within said casing comprising a supporting member having oppositely extended alined tubular hubs which are rotatably mounted in bearings fixed to said casing, compensating gears mounted upon said supporting member, and driven gears meshing with said compensating gears and mounted on said supporting member with their axes coincident with the axis of rotation of said supporting member, axle sections which extend into said casing into engagement with said differential mechanism and separable therefrom by endwise movement without displacing said differential mechanism, and means normally preventing the outward endwise disengaging movement of said axle sections.

15. The combination of a differential gear casing having a removable cap and two laterally extended tubes, with differential gearing within said casing comprising (1) a supporting member having oppositely projecting alined tubular hubs, (2) the compensating gears mounted on said supporting member, (3) driven gears meshing with said compensating gears and mounted on the supporting member with their axes coincident with the axis of rotation of said supporting member, and (4) bearing rings in which hubs of said supporting member are rotatably mounted, which bearing rings are removably secured within the casing, axle sections which extend through the casing tubes and have operative connections with said driven gears, which connections may be severed by the outward endwise movement of said axle sections, whereby it is possible when the said cap has been removed and the axle sections drawn outward and the bearing rings disconnected from the casing, to remove said differential gear and its bearing rings as a unit from said casing, and means normally preventing the outward movement of said axle sections.

16. The combination of a differential gear casing having a removable cap and two laterally extended tubes with differential gearing within said casing, comprising (1) a supporting member having oppositely projecting alined tubular hubs, (2) the compensating gears mounted on said supporting member, (3) driven gears meshing with said compensating gears and mounted on the supporting member with their axes coincident with the axis of rotation of said supporting member, and (4) bearing rings in which hubs of said supporting member are rotatably mounted, which bearing rings are removably secured within the casing, axle sections which extend through the casing tubes and have operative connections with said driven gears, which connections are severed by the outward endwise movement of said axle sections, whereby it is possible, when the said cap has been removed and the axle sections drawn outward and bearing rings disconnected from the casing, to remove said differential gear and its bearing rings as a unit from said casing, means normally preventing the outward movement of said axle sections, driven wheels rotatably mounted on the outer ends of said tubes, and means operatively connecting said wheels with the projecting outer ends of said axle sections.

17. The combination of a differential gear casing having a removable cap and two laterally extended tubes, with differential gearing within said casing and removable as a unit through the opening covered by said cap, said differential gearing comprising (1) a supporting member having oppositely projecting alined tubular hubs, (2) the compensating gears mounted on said supporting member, (3) driven gears meshing with said compensating gears and mounted on the supporting member with their axes coincident with the axis of rotation of said supporting member, and (4) bearing rings in which hubs of said supporting member are rotatably mounted, said bearing rings having outwardly extended ears by means of which the bearing rings are removably secured within the casing, axle sections which extend through the casing tubes and have operative connections with said driven gears, which connections are severed by the outward endwise movement of said axle sections, and means normally preventing the outward movement of said axle sections.

18. The combination of a differential gear casing having two laterally extended tubes, differential gearing within said casing comprising (1) a supporting member having oppositely extended alined tubular hubs which are rotatably mounted in bearings fixed in the casing, (2) compensating gears mounted on said supporting member, and (3) driven gears meshing with said compensating gears and mounted on the supporting member, with their axes coincident with the axis of rotation of said supporting member, with axle sections which extend through the casing member and have at their inner ends loose telescoping driving connections with said driven gears respectively, road wheels rotatably mounted on the outer ends of the casing tubes, interlocking jaws carried by the outer ends of said axle sections and by the hubs of said driving wheels, and means preventing the outward endwise movement of said axle sections.

LOUIS P. MOOERS.

Witnesses:
E. L. THURSTON,
H. R. SULLIVAN.